US011778686B2

(12) United States Patent
Tang

(10) Patent No.: US 11,778,686 B2
(45) Date of Patent: Oct. 3, 2023

(54) ALWAYS-ON PDU SESSION MANAGEMENT METHOD AND DEVICE

(71) Applicant: DATANG MOBILE COMMUNICATIONS EQUIPMENT CO., LTD., Beijing (CN)

(72) Inventor: Tingfang Tang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 175 days.

(21) Appl. No.: 17/268,028

(22) PCT Filed: Jul. 10, 2019

(86) PCT No.: PCT/CN2019/095446
§ 371 (c)(1),
(2) Date: Feb. 11, 2021

(87) PCT Pub. No.: WO2020/034791
PCT Pub. Date: Feb. 20, 2020

(65) Prior Publication Data
US 2021/0204357 A1 Jul. 1, 2021

(30) Foreign Application Priority Data
Aug. 13, 2018 (CN) .......................... 201810917672.7

(51) Int. Cl.
*H04W 4/00* (2018.01)
*H04W 76/34* (2018.01)
(Continued)

(52) U.S. Cl.
CPC ............ *H04W 76/34* (2018.02); *H04W 8/08* (2013.01); *H04W 48/16* (2013.01); *H04W 76/25* (2018.02)

(58) Field of Classification Search
CPC ..... H04W 76/25; H04W 76/34; H04W 48/16; H04W 8/08
(Continued)

(56) References Cited

U.S. PATENT DOCUMENTS

| 2017/0289898 A1 | 10/2017 | Youn et al. | |
| 2018/0199398 A1* | 7/2018 | Dao | H04W 76/27 |
| 2018/0227807 A1* | 8/2018 | Youn | H04W 88/16 |
| 2018/0227872 A1* | 8/2018 | Li | H04W 8/02 |
| 2018/0227873 A1* | 8/2018 | Vrzic | H04W 28/26 |

FOREIGN PATENT DOCUMENTS

| CN | 106612307 A | 5/2017 |
| CN | 107959918 A | 4/2018 |

(Continued)

OTHER PUBLICATIONS

NTT Docomo, "3GPP TSG-SA2 Meeting #127-Bis, S2-185416" Correction of Having Multiple S-NSSAIs for a Single PDU Session, May 22, 2018.
(Continued)

*Primary Examiner* — Temica M Beamer
(74) *Attorney, Agent, or Firm* — Meunier Carlin & Curfman LLC

(57) ABSTRACT

Embodiments of the present invention relate to the technical field of communications, and particularly relate to an always-on PDU session management method and device for reducing system overhead and improving user experience. The method provided in the embodiments of the present invention comprise: a session management function (SMF) determining that an attribute of a PDU session is an always-on PDU session; the SMF recording the attribute of the PDU session in a session management context; and the SMF managing the PDU session according to the attribute of the PDU session recorded in the session management context.

13 Claims, 9 Drawing Sheets

(51) Int. Cl.
*H04W 76/25* (2018.01)
*H04W 8/08* (2009.01)
*H04W 48/16* (2009.01)

(58) Field of Classification Search
USPC .......................................................... 370/329
See application file for complete search history.

(56) References Cited

FOREIGN PATENT DOCUMENTS

| CN | 108307459 A | 7/2018 |
| CN | 110519775 A | 11/2019 |
| CN | 111107664 A | 5/2020 |
| WO | 2017142171 A1 | 8/2017 |
| WO | 2018141269 A1 | 9/2018 |

OTHER PUBLICATIONS

International Search Report for International Application No. PCT/CN2019/095446 dated Sep. 26, 2019.
3GPP TS 23.502 V15.2.0 (Jun. 2018) 308 pages.
Huawei, Hisilicon, 3GPP TSG CT WG1 Meeting #111bis, Sophia-Antipolis (France), Jul. 9-13, 2018, Discussion on network control for always-on PDU sessions (C1-184315).
Huawei, Hisilicon, 3GPP TSG-CT WG1 Meeting #111bis, Sophia-Antipolis (France), Jul. 9-13, 2018, Network control for always-on PDU sessions (C1-184858).

* cited by examiner

ALWAYS-ON PDU SESSION MANAGEMENT METHOD AND DEVICE

The present application is a National Stage of International Application PCT No. PCT/CN2019/095446 filed on Jul. 10, 2019, which claims the priority from Chinese Patent Application No. 201810917672.7, filed with the Chinese Patent Office on Aug. 13, 2018 and entitled "Always-On PDU Session Management Method and Device", both of which are hereby incorporated by reference in their entireties.

FIELD OF INVENTION

The present invention relates to the field of communication technology, and in particular to an always-on PDU session management method and device.

BACKGROUND

At present, the 5th-Generation mobile communication technology (5G) system supports the characteristic of selective Protocol Data Unit (PDU) session activation/deactivation, that is, a User Equipment (UE) that has established multiple PDU sessions can choose to activate/deactivate the specified PDU session. The 5G system supports services with low latency and high reliability, e.g., Multimedia Priority Service (MPS), Mission Critical Service (MCS) and emergency services, etc. In order to reduce the delay of service recovery, the always-on PDU session is introduced in 5G. Regardless of whether there is uplink data to be transmitted, such session activates the user plane resources when the UE converts from the 5th Generation Mobility Management (5GMM)-IDLE mode to the 5GMM-CONNECTED mode. The establishment of the UE-controlled always-on PDU session is only perceived by the UE, and the upper layer of the UE instructs the establishment and the activation of user plane resources.

In the prior art, the network side can selectively deactivate a session, but the network side does not consider whether the session is an always-on session, so the always-on session may be deactivated by the network side according to the trigger condition of the normal session, and then it is activated in the subsequent registration update or service request process. Such repeated deactivation/activation of user plane resources when the always-on session does not need to transmit data increases the overall system overhead.

BRIEF SUMMARY

The present application provides an always-on PDU session management method and device, so as to save the system overhead and improve the user experience.

An always-on PDU session management method provided by an embodiment of the present invention includes:
determining, by a session management function, that an attribute of a PDU session is always-on;
recording, by the session management function, the attribute of the PDU session in a session management context;
managing, by the session management function, the PDU session according to the attribute of the PDU session in the session management context.

Optionally, the determining, by the session management function, that an attribute of a PDU session is always-on, includes:
receiving, by the session management function, a session management context establishment request sent by an access and mobility management function, wherein the session management context establishment request includes the attribute of the PDU session;
determining, by the session management function, that the PDU session is always-on according to the session management context establishment request.

Optionally, the session management context establishment request includes the attribute of the PDU session, including:
the attribute of the PDU session is obtained from a session establishment request from a user equipment forwarded by the access and mobility management function, wherein the session establishment request includes the attribute of the PDU session; or
the attribute of the PDU session is determined by the access and mobility management function and included in the session management context establishment request, and the access and mobility management function determines the attribute of the PDU session according to one or more of: a received session establishment request sent by a user equipment, user subscription information and/or a preset policy.

Optionally, the determining, by the session management function, that an attribute of a PDU session is always-on, includes:
determining, by the session management function, the attribute of the PDU session according to one or more of: a session management context establishment request, user subscription information and/or a preset policy.

Optionally, the managing, by the session management function, the PDU session according to the attribute of the PDU session in the session management context, includes:
managing, by the session management function, a deactivation of the PDU session according to the attribute of the PDU session in the session management context; or
managing, by the session management function, session switching management on the PDU session according to the attribute of the PDU session in the session management context.

Optionally, the managing, by the session management function, a deactivation of the PDU session, includes:
setting, by the session management function, no inactive time period for the PDU session according to the attribute of the PDU session being always-on.

Optionally, the managing, by the session management function, a deactivation of the PDU session, includes:
sending, by the session management function, an inactive time period to a user plane function;
receiving, by the session management function, a message sent by the user plane function that the PDU session has no data transmission during the inactive time period;
not deactivating, by the session management function, the PDU session according to the attribute of the PDU session being always-on.

Optionally, the managing, by the session management function, a deactivation of the PDU session, includes:
receiving, by the session management function, a message sent by the access and mobility management function that the user equipment moves out of an allowed area;
not deactivating, by the session management function, the PDU session according to the attribute of the PDU session being always-on.

Optionally, the managing, by the session management function, session switching management on the PDU session, includes:

receiving, by the session management function, a session update request sent by the access and mobility management function, and determining that the user equipment enters a non-allowed area;

modifying, by the session management function, user plane resources for the PDU session and performing session switching according to the attribute of the PDU session being always-on.

An embodiment of the present invention further provides an always-on PDU session management device, including:

a determining unit configured to determine that an attribute of a PDU session is always-on;

a recording unit configured to record the attribute of the PDU session in a session management context;

a management unit configured to manage the PDU session according to the attribute of the PDU session in the session management context.

Optionally, the device further includes a transceiver unit configured to receive a session management context establishment request sent by an access and mobility management function, wherein the session management context establishment request includes the attribute of the PDU session;

the determining unit is configured to determine that the PDU session is always-on according to the session management context establishment request.

Optionally, the attribute of the PDU session is obtained from a session establishment request from a user equipment forwarded by the access and mobility management function, wherein the session establishment request includes the attribute of the PDU session; or the attribute of the PDU session is determined by the access and mobility management function and included in the session management context establishment request, and the access and mobility management function determines the attribute of the PDU session according to one or more of: a received session establishment request sent by a user equipment, user subscription information and/or a preset policy.

Optionally, the determining unit is further configured to:

determine the attribute of the PDU session according to one or more of: a session management context establishment request, user subscription information and/or a preset policy.

Optionally, the management unit is specifically configured to:

manage a deactivation of the PDU session according to the attribute of the PDU session in the session management context; or manage session switching management on the PDU session according to the attribute of the PDU session in the session management context.

Optionally, the management unit is configured to:

set no inactive time period for the PDU session according to the attribute of the PDU session being always-on.

Optionally, the device further includes a transceiver unit configured to send an inactive time period to a user plane function; and receive a message sent by the user plane function that the PDU session has no data transmission during the inactive time period;

the management unit is configured to not deactivate the PDU session according to the attribute of the PDU session being always-on.

Optionally, the device further includes a transceiver unit configured to receive a message sent by the access and mobility management function that the user equipment moves out of an allowed area;

the management unit is configured to not deactivate the PDU session according to the attribute of the PDU session being always-on.

Optionally, the device further includes a transceiver unit configured to receive a session update request sent by the access and mobility management function;

the management unit is configured to:

determine that the user equipment enters a non-allowed area;

modify user plane resources for the PDU session and perform session switching according to the attribute of the PDU session being always-on.

An embodiment of the invention further provides an electronic device, including:

at least one processor, and a memory communicatively connected to the at least one processor; wherein:

the memory stores instructions that can be executed by the at least one processor, and the instructions are executed by the at least one processor to enable the at least one processor to perform the above method.

An embodiment of the present invention further provides a non-transitory computer readable storage medium storing computer instructions, which are configured to cause the computer perform the above method.

In the embodiments of the present invention, the session management function on the network side determines that the attribute of the PDU session is always-on, and records it in the session management context. The session management function manages the PDU session according to the attribute of the PDU session recorded in the session management context. In this way, the network side can control whether the user plane resources of the always-on PDU session are deactivated, avoiding unnecessary waste of user plane resources in the processes of deactivating/activating the PDU session. In addition, when the UE moves into the non-allowed area, the network side can complete the switching of the always-on PDU session according to a predetermined strategy, eliminating the re-establishment of the always-on PDU session, saving the network overhead and improving the user experience.

BRIEF DESCRIPTION OF THE DRAWINGS

In order to illustrate the technical solutions in the embodiments of the invention more clearly, the accompanying figures which need to be used in describing the embodiments will be introduced below briefly. Obviously the accompanying figures described below are only some embodiments of the invention, and other accompanying figures can also be obtained by those ordinary skilled in the art according to these accompanying figures without creative labor.

DETAILED DESCRIPTION OF THE EMBODIMENTS

Figure 1:
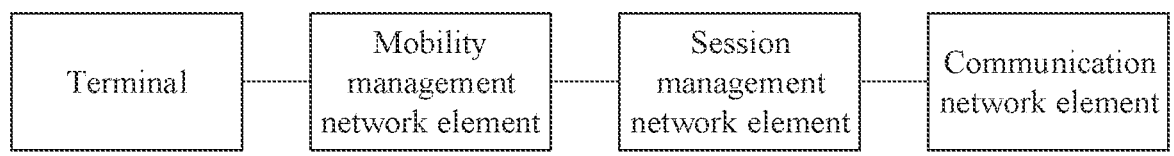
FIG. 1 is a schematic diagram of a possible network architecture applicable to the embodiments of the present invention.

In order to make the purposes, technical solutions and advantages of the invention clearer, the technical solutions in the embodiments of the invention will be described clearly and completely below in combination with the accompanying drawings in the embodiments of the invention. Obviously the described embodiments are a part of the embodiments of the invention but not all the embodiments. Based upon the embodiments of the invention, all of other embodiments obtained by those ordinary skilled in the art without creative work pertain to the protection scope of the invention.

It should be understood that the technical solutions of the invention can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

It should be further understood that the User Equipment (UE) includes but not limited to a Mobile Station (MS), a mobile terminal, a mobile telephone, a handset, a portable equipment or the like in the embodiments of the invention. This user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or vehicle-carried mobile device.

In some embodiments of the invention, the base station (e.g., access point) may mean the device in the access network communicating with the wireless terminal via one or more sectors over the air interface. The base station may be used to perform the inter-conversion between the received air frame and the IP packet, and used as the router between the wireless terminal and the rest of the access network, wherein the rest of the access network may include Internet Protocol (IP) networks. The base station may further coordinate the attribute management of the air interface. For example, the base station may be the Base Transceiver Station (BTS) in the GSM or CDMA, or may be the NodeB in the TD-SCDMA or WCDMA, or may be the evolutional Node B (eNodeB or eNB or e-NodeB) in the LTE, or may be the gNB in the 5G NR, which is not limited in the invention.

The network architectures and service scenarios described in the embodiments of the present application are intended to illustrate the technical solutions of the embodiments of the present application more clearly, and do not constitute a limitation on the technical solutions provided in the embodiments of the present application. As can be known by those ordinary skilled in the art, with the evolution of network architectures and the emergence of new service scenarios, the technical solutions provided in the embodiments of the present application are also applicable to similar technical problems.

As shown in FIG. 1, it is a schematic diagram of a possible network architecture applicable to the embodiments of the present invention. The network architecture includes a terminal, a mobility management network element, and a session management network element. Optionally, it also includes a communication network element.

The terminal (i.e., UE) is a device with the wireless transceiver function, and can be deployed on land, including indoor or outdoor, handheld or vehicle-mounted; or can also be deployed on the water (such as ship, etc.); or can also be deployed in the air (e.g., on the airplane, balloon and satellite, etc.). The terminal may be: mobile phone, Pad, computer with wireless transceiver function, Virtual Reality (VR) terminal, Augmented Reality (AR) terminal, wireless terminal in the industrial control, wireless terminal in the self-driving, wireless terminal in the remote medical, wireless terminal in the smart grid, wireless terminal in the transportation safety, wireless terminal in the smart city, wireless terminal in the smart home, etc.

The mobility management network element is mainly responsible for the mobility management in the mobile network, such as user location update, user registration network, user switching, etc. For example, the mobility management network element may be an Access and Mobility management Function (AMF) network element in 5G.

The session management network element is mainly responsible for the establishment, modification, release and management of service sessions, the allocation management of UE IP, the selection and control of UPF for sessions, etc., and for example, it may be an SMF (Session Management Function) network element in 5G.

The communication network element is mainly responsible for routing and forwarding of data packets. QoS flow mapping, etc., and for example, it may be a User Plane Function (UPF), a Policy Control Function (PCF) network element in 5G.

It can be understood that the above-mentioned functions may be network elements in hardware devices, or software functions running on the dedicated hardware, or virtualization functions instantiated on a platform (for example, cloud platform).

For the convenience of description, the AMF network element, SMF network element, UPF network element and PCF network element will be respectively referred to as AMF, SMF, UPF and PCF for short hereafter.

In the prior art, whether a PDU session is an always-on PDU session is completely determined and triggered by the UE, and is purely perceived by the UE. The network side does not perceive whether the PDU session is an always-on PDU session, and treats the always-on PDU session as a general PDU session. The network side may deactivate the always-on PDU session according to the triggering condition of the normal PDU session, and then the UE may reactivate the always-on PDU session in the subsequent registration update or service request process. Such repeated deactivation/activation of user plane resources increases the overall system overhead.

In order to illustrate the problem existing in the prior art, a specific process is used to illustrate in the following.

Figure 2:
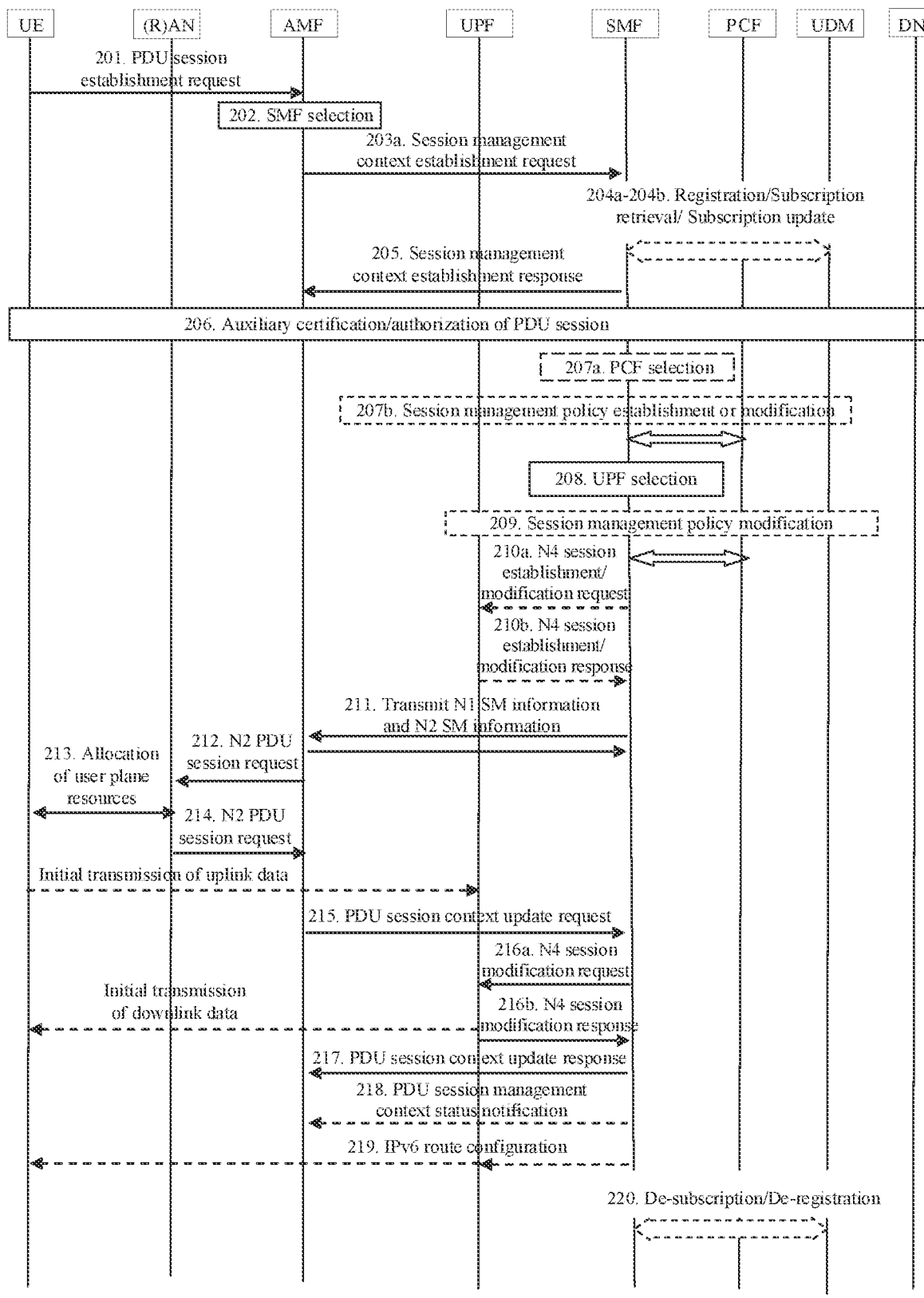
FIG. 2 is a schematic diagram of a process in which a UE requests the PDU session establishment in the prior art.

FIG. 2 is a process in which a UE requests the PDU session establishment in the prior art. As shown in FIG. 2, the process includes the following steps.

Step 201: the UE sends a Non Access Stratum (NAS) message to an AMF, where the NAS message includes Network Slice Selection Assistance Information (S-NSSAI(s)), Data Network Name (DNN), PDU session ID, request type, old PDU session ID, PDU session establishment request (N1 SM container).

Step 202: the AMF selects an SMF for the initial session to prepare for further routing the Session Management (SM) information.

Steps 203-205: the process of establishing the session management context from the AMF to the SMF, wherein the step 203 is that the AMF sends a session management context establishment request to the SMF.

Step 206: optionally, auxiliary certification/authorization.

Steps 207a-209: the SMF selects a PCF and executes the session management policy establishment process, wherein the step 208 is selecting a UPF for the initial session.

Steps 210a-210b: the SMF initiates an N4 session establishment process to the selected UPF.

The step 210a is that the SMF sends an N4 session establishment/modification request to the UPF and provides the packet detection, execution and reporting rules to be installed on the UPF for the PDU session. If the Core Network (CN) tunnel information is allocated by the SMF, the CN tunnel information is provided to the UPF in this step. If the PDU session needs to selectively deactivate the user plane, the SMF decides the inactivity timer and provides it to the UPF.

The step 210b is that the UPF confirms by sending an N4 session establishment/modification response to the SMF. If the CN tunnel information is allocated by the UPF, the CN tunnel information is provided to the SMF in this step.

Steps 211-214: the SMF sends the N1 SM information and N2 SM information through the AMF, notifies the core network address of the N3 tunnel corresponding to the Radio Access Network (RAN) side, completes the allocation of user plane resources of the RAN side, completes the establishment of the uplink data link, and returns the AN tunnel information to the CN.

Steps 215-217: the AMF notifies the SMF to update the Access Network (AN) tunnel information to complete the establishment of the downlink data link.

Step 218: [conditional] the SMF sends a session management context status notification Nsmf_PDUSession_SMContextStatusNotify (Release) to the AMF.

Step 219: the SMF reaches the UE through the UPF: if the PDU type is Internet Protocol Version 6 (IPv6) or Internet Protocol Version 4 and Version 6 (IPv4v6), the SMF generates an IPv6 routing notification and sends it to the UE and UPF through N4.

Step 220: if the PDU session establishment fails after the step 4 of the process, the SMF de-registers the PDU session.

In the above steps 201 to 220, whether the PDU session is an always-on PDU session is determined by the UE, but the UE does not inform the network side that the PDU session is an always-on PDU session, or it can be said that the network side does not perceive whether the PDU session is an always-on PDU session. Therefore, when the condition for deactivation of a normal PDU session is met, the SMF will deactivate the always-on PDU session.

Figure 3:
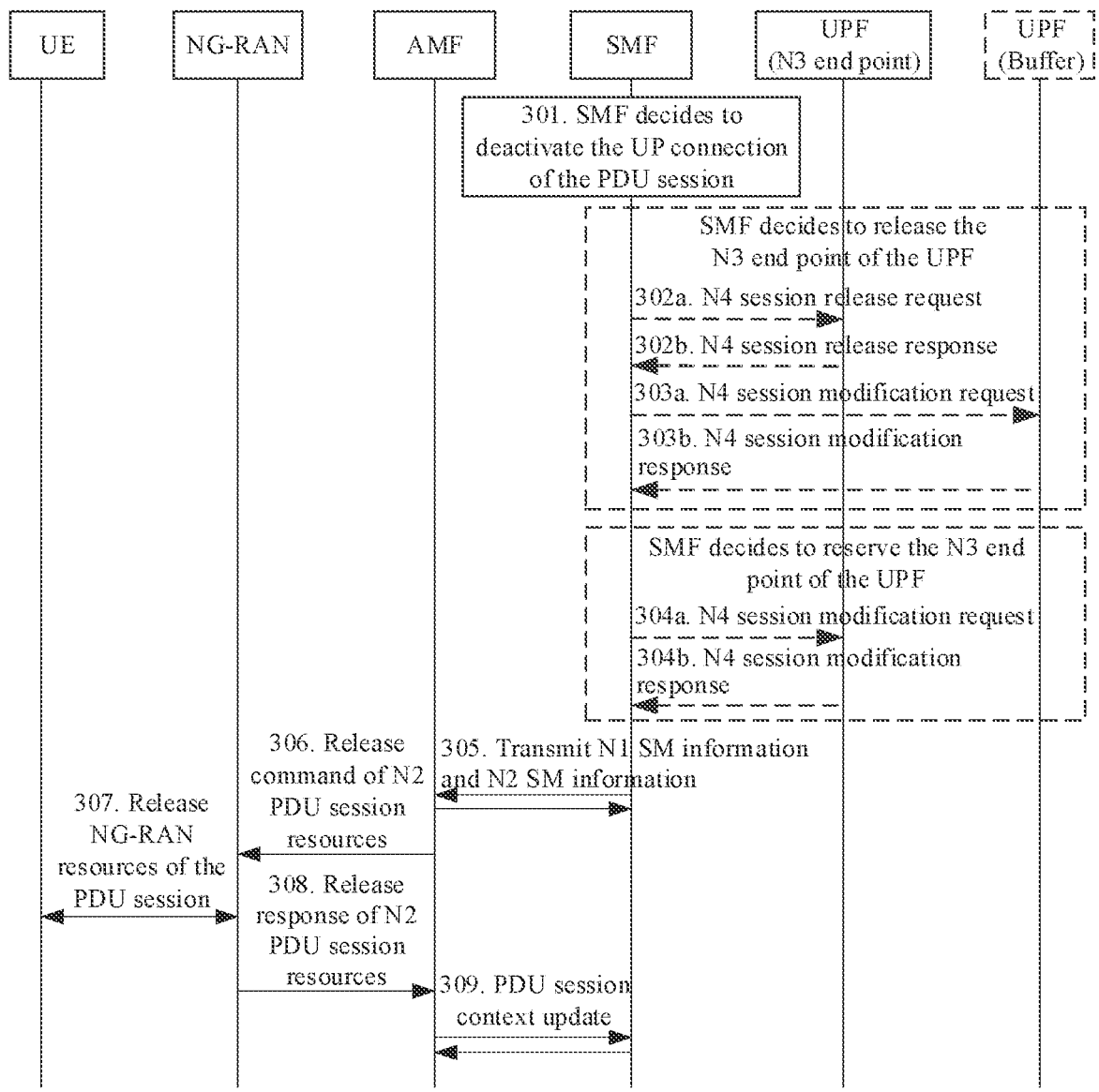
FIG. 3 is a flow schematic diagram of the selective deactivation of the UP connection of the PDU session initiated by the CN in the prior art.

FIG. 3 is the selective deactivation of the UP connection of the PDU session initiated by the CN in the prior art. As shown in FIG. 3, it includes the following steps.

Step 301: the SMF may decide to deactivate the UP connection of the PDU session in the following scenarios.

Scenario 1: the target Radio Access Network (NG-RAN) rejects all Quality of Service (QoS) flows of the PDU session during the handover process.

Scenario 2: the UPF detects that the PDU session has no data transmission during a specific inactive time period (inactivity timer).

Scenario 3: for a Local Area Data Network (LADN) PDU session, the AMF notifies the SMF that the UE has moved out of the LADN service area.

Scenario 4: the AMF notifies the SMF that the UE has moved out of the allowed area.

The SMF may decide to release the N3 end point of the UPF. In this case, the SMF performs the step 302 and step 303. Otherwise, the SMF decides to reserve the N3 end point of the UPF, and then the SMF performs the step 304.

Step 302: the SMF initiates the N4 session release process to release the N3 end point of the intermediate UPF. If there are multiple intermediate UPFs, this step needs to be performed for each UPF that needs to be released. The SMF initiates the N4 session modification process to the UPF (that is, the N9 end point or PDU Session Anchor (PSA)).

Step 303: if the intermediate UPF supporting the N3 end point is released in the step 302, the SMF sends the N4 session modification process to a UPF (i.e., PSA or other intermediate UPF) connected to the released UPF, to indicate to delete the AN tunnel information corresponding to the N3 tunnel of the PDU session. In this scenario, the UPF connected to the released UPF will be responsible for buffering the downlink data of the PDU session. Otherwise, the N4 session modification process is directly initiated to the N3 end point.

Step 304: if the UPF of the N3 end point is not released in the step 302, the SMF initiates the N4 session modification process, to indicate that the AN tunnel information of the N3 tunnel of the corresponding PDU session needs to be deleted. If the PDU session is related to the LADN, the SMF notifies the UPF to discard the downlink data of the PDU session and/or no longer provide a data notification message to the SMF subsequently.

Step 305: the SMF invokes the Namf_Communication_N1N2MessageTransfer service operation which includes the N2 SM information (PDU session ID), and releases the NG-RAN resources of the PDU session.

Step 306: the AMF sends a release command of N2 PDU session resources to the NG-RAN, where the message includes the N2 SM information received by the AMF from the SMF.

Step 307: the NG-RAN performs the related signaling interaction with the UE, and releases the NG-RAN resources of the PDU session.

Step 308: the NG-RAN returns the release command of N2 PDU session resources to the AMF.

Step 309: the AMF invokes the Nsmf_PDUSession_UpdateSMContext service operation to confirm the service received by the AMF in the step 304.

The above steps 301 to 309 are used to deactivate the UP connection of the established PDU session of the UE in the CM-CONNECTED state. Since the management of the network side for the PDU session does not consider whether the PDU session is an always-on PDU session, the processing of the always-on PDU session is the same as the processing of other PDU sessions, that is, it is deactivated in the scenarios 1 to 4.

But for the deactivated always-on PDU session, the UE will reactivate the always-on PDU session. Generally, the UE in the CM-IDLE state requests the establishment of a secure connection with the AMF through the service request process. When the UE is in the CM-IDLE state and CM-CONNECTED state, this process is also used to activate the user plane connection of the established PDU session. The UE can selectively activate the specified PDU session through this process, and activate the always-on PDU session through the session (list) that carries the always-on PDU session in the service request.

If the user data triggers a Service Request, a list of PDU sessions that need to be activated is included in the NAS Service Request message sent by the UE to the AMF to indicate the PDU sessions that the UE needs to activate. In the case that the UE has an always-on PDU session, regardless of whether the UE needs to transmit the data to be sent, a list of always-on PDU sessions needs to be carried as long as the user plane resources of the current always-on PDU session are not established. If the Service Request is triggered only by sending signaling and the UE has no always-on PDU session, the NAS Service Request message includes no PDU session that needs to be activated. Otherwise, when the UE has always-on PDU sessions, the NAS Service Request message includes a list of always-on PDU sessions. When this process is triggered for a paging response, if the UE needs to send user data at the same time, the UE carries the PDU session that needs to activate the user plane connection in the MM NAS Service Request message to indicate the PDU session that the UE needs to use. Otherwise, the message sent by the UE will include no PDU session ID.

On the other hand, the UE can also activate the user plane resources of the always-on PDU session during the registration update process. During the registration update process of the UE, if the UE needs to transmit the data to be sent, the UE will carry the Uplink data status IE parameter in the REGISTRATION REQUEST message to activate the user plane resources of the corresponding PDU session. In the case that the UE has an always-on PDU session, regardless of whether the UE needs to transmit the data to be sent, a corresponding session list needs to be included in the Uplink data status IE parameter to thereby complete the establishment of the user plane resources of the always-on PDU session as long as the user plane resources of the current always-on PDU session are not established.

It can be seen from the above process that, in the prior art, once the deactivation condition of a normal PDU session is met, the SMF will deactivate the PDU session regardless of whether the PDU session is an always-on PDU session. However, if the PDU session is an always-on PDU session, the UE will activate the always-on PDU session again. Such frequent deactivation/activation wastes the network resources.

The session management method provided by the present application will be specifically illustrated below, so as to solve the above-mentioned problem. It should be noted that the present application is not limited to the system architecture shown in FIG. 1 and can also be applied to other future communication systems, e.g., 6G system architecture, etc. In addition, the names of the various network elements used in the present application may maintain the same functions in future communication systems, but the names may change.

Figure 4:
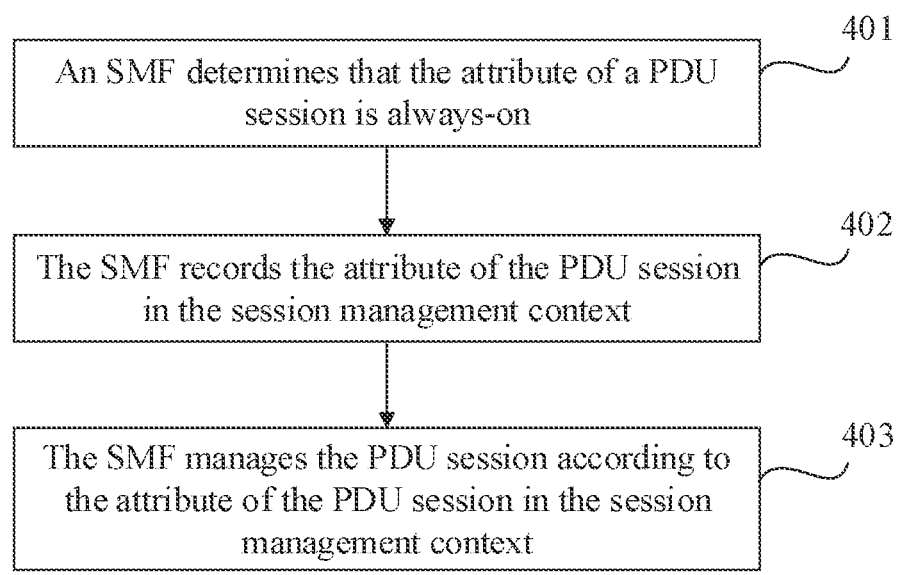
FIG. 4 is a flow schematic diagram of an always-on PDU session management method provided by an embodiment of the present invention.

An embodiment of the present invention provides an always-on PDU session management method. As shown in FIG. 4, the always-on PDU session management method provided by the embodiment of the present invention includes the following steps.

Step 401: an SMF determines that the attribute of a PDU session is an always-on PDU session.

Step 402: the SMF records the attribute of the PDU session in the session management context.

Step 403: the SMF manages the PDU session according to the attribute of the PDU session in the session management context.

In some embodiments of the present invention, the SMF on the network side determines that the attribute of the PDU session is an always-on PDU session, and records it in the session management context. The SMF manages the PDU session according to the attribute of the PDU session recorded in the session management context. In this way, the network side can control whether the user plane resources of the always-on PDU session are deactivated, avoiding unnecessary waste of user plane resources in the processes of deactivating/activating the PDU session. In addition, when the UE moves into the non-allowed area, the network side can complete the switching of the always-on PDU session according to a predetermined strategy, eliminating the re-establishment of the always-on PDU session, saving the network overhead and improving the user experience.

In some embodiments of the present invention, the attribute of the PDU session may be determined by the UE according to the characteristics of the service. For example, for a service with low latency and high reliability, the corresponding PDU session is set as an always-on PDU session. The attribute of the PDU session may also be determined by the network side. For example, the AMF or SMF may set the PDU session as an always-on PDU session according to the UE request, UE subscription information and/or preset local policy.

Therefore, in the above step 401, the SMF determines that the attribute of the PDU session is an always-on PDU session, including:

the SMF receive a session management context establishment request sent by the AMF, where the session management context establishment request includes the attribute of the PDU session;

the SMF determines that the PDU session is an always-on PDU session according to the session management context establishment request.

Here, the session management context establishment request includes the attribute of the PDU session, including:

the attribute of the PDU session is obtained by the AMF from the received session establishment request sent by a UE, where the session establishment request includes the attribute of the PDU session; or the attribute of the PDU session is determined by the access and mobility management function and included in the session management context establishment request, and the access and mobility management function determines the attribute of the PDU session according to one or more of: a received session establishment request sent by a user equipment, user subscription information and/or a preset policy.

That is to say, in the process of initiating the establishment of the PDU session, the UE decides that the attribute of the PDU session is an always-on PDU session, and adds the attribute information to the session establishment request (PDU Session Establishment Request) and sends it to the AMF. The AMF selects the corresponding SMF for the PDU session, sends a session management context establishment request (Nsmf_PDUSession_CreateSMContext Request) to the SMF, and carries the attribute information that the PDU session is an always-on PDU session in the session management context establishment request. In this way, the SMF can determine that the attribute of the PDU session is an always-on PDU session according to the received session management context establishment request.

In another embodiment, the AMF decides that the attribute of the PDU session is an always-on PDU session. After receiving the session establishment request sent by the UE, the AMF can decide that the PDU session is an always-on PDU session according to one or more of the session establishment request, user subscription information and/or local policy regardless of whether the session establishment request carries the information that the attribute of the PDU session is an always-on PDU session, and add the attribute of the always-on PDU session to the session management context establishment request and send it to the SMF.

In yet another embodiment, the SMF may also decide that the attribute of the PDU session is an always-on PDU session. That is, the SMF determines that the attribute of the PDU session is an always-on PDU session, including:

the SMF determines the attribute of the PDU session according to one or more of: a session management context establishment request, user subscription information and/or a preset policy.

At this time, after receiving the session management context establishment request sent by the AMF, the SMF can decide that the PDU session is an always-on PDU session according to the session management context establishment request, user subscription information and/or local policy, regardless of whether the session management context establishment request includes the information that the attribute of the PDU session is an always-on PDU session.

With any of the above methods, after determining that the PDU session is an always-on PDU session, the SMF can add the attributes of the always-on PDU session to the session management context. Then, the SMF manages the PDU session according to the attribute of the PDU session in the session management context.

Further, the step in which the SMF manages the PDU session according to the attribute of the PDU session in the session management context includes:

the SMF performs the deactivation management on the PDU session according to the attribute of the PDU session in the session management context; or the SMF performs the session switching management on the PDU session according to the attribute of the PDU session in the session management context.

In some embodiments of the present invention, the SMF performs the deactivation management on the PDU session according to the attribute of the PDU session in the session management context, and the deactivation of the user plane resources of the always-on PDU session can be controlled by the network side, that is, when the PDU session is an always-on PDU session, the network side chooses not to deactivate the always-on PDU session, avoiding unnecessary waste of user plane resources caused by unnecessary deactivation/activation of the PDU session and saving the system overhead. On the other hand, the SMF performs the session switching management on the PDU session according to the attribute of the PDU session in the session management context, and the network side can directly switch the always-on PDU session moving into the non-allowed area according to the local policy, which also omits the process of deactivating the PDU session and then initiating the PDU session by the UE, saves the network overhead and improves the user experience.

In the prior art, the SMF decides to deactivate the UP connection of the PDU session in the following scenarios.

Scenario 1: the target Radio Access Network (NG-RAN) rejects all Quality of Service (QoS) flows of the PDU session during the handover process.

Scenario 2: the UPF detects that the PDU session has no data transmission during a specific inactive time period (inactivity timer).

Scenario 3: for a Local Area Data Network (LADN) PDU session, the AMF notifies the SMF that the UE has moved out of the LADN service area.

Scenario 4: the AMF notifies the SMF that the UE has moved out of the allowed area.

When the UE is in the above scenarios, the SMF will initiate the deactivation of the PDU session regardless of whether the PDU session is an always-on PDU session, which may cause the waste of system resources.

In an embodiment of the present invention, for the scenario 2 and scenario 4 in the foregoing scenarios, the SMF may decide not to initiate the deactivation process of the always-on PDU session according to the attribute of the PDU session, which specifically includes three following modes.

In a first mode, the SMF performs the deactivation management on the PDU session, including:

the SMF sets no inactive time period for the PDU session according to the attribute of the PDU session being the always-on PDU session.

In the prior art, if the PDU session needs to selectively deactivate the user plane, the SMF decides the inactivity timer and provides it to the UPF. In the embodiment of the present invention, the SMF sets no inactivity timer for the always-on PDU session, that is, there is no inactivity timer for the always-on PDU session, so the UPF will not detect that the always-on PDU session has no data transmission in the inactivity timer, and will not trigger the deactivation process of the always-on PDU session.

In a second mode, the SMF performs the deactivation management on the PDU session, including:

the SMF sends an inactive time period to the UPF;

the SMF receives a message sent by the UPF that the PDU session has no data transmission during the inactive time period;

the SMF does not trigger the deactivation process of the PDU session according to the attribute of the PDU session being the always-on PDU session.

For the trigger condition of the scenario 2, in an embodiment of the present invention, the SMF may also set an inactivity timer for the always-on PDU session and sends the inactivity timer to the UPF in the establishment process of the always-on PDU session. When the UPF determines that the always-on PDU session has no data transmission during the inactive time period, it sends this message to the SMF. After receiving the message that the PDU session has no data transmission during the inactive time period, the SMF determines that the PDU session is an always-on PDU session according to the attribute, and then the SMF chooses not to trigger the deactivation process of the always-on PDU session.

In a third mode, the SMF performs the deactivation management on the PDU session, including:

the SMF receives a message sent by the AMF that the UE moves out of an allowed area;

the SMF does not trigger the deactivation process of the PDU session according to the attribute of the PDU session being the always-on PDU session.

When the UE moves out of the allowed area, for each PDU session on the UE, the SMF corresponding to the PDU session can determine whether to trigger the deactivation of the PDU session according to the attribute of the PDU session. If the PDU determines that the PDU session is an always-on PDU session, the deactivation process of the PDU session is not triggered. The above three modes all avoid the unnecessary deactivation/activation process of the always-on PDU session and save the network overhead.

Furthermore, in an embodiment of the present invention, the SMF also performs the session switching management on the PDU session according to the PDU session being an always-on PDU session, including:

the SMF receives a session update request sent by the AMF, and determines that the UE enters the non-allowed area;

the SMF modifies user plane resources for the PDU session and performs session switching according to the attribute of the PDU session being the always-on PDU session.

The scenario where the UE moves from the allowed area to the non-allowed area will be involved regardless of whether the switching is based on Xn (the interface between two NG-RAN nodes) or N2 (the interface between the RAN and the AMF). In the prior art, when a UE enters the non-allowed area, for the SMF corresponding to each PDU session on the UE, the AMF notifies each SMF that the UE can reach only in the case of regulatory prioritized services. That is, when the UE enters the non-allowed area, if the PDU session is not regulatory prioritized services but an always-on PDU session, the SMF still rejects the switching of the always-on PDU session. In an embodiment of the invention, after receiving a session update request sent by the AMF, the SMF queries the attribute of the PDU session from the session management context. If the SMF determines that the PDU session is an always-on PDU session, it can choose to accept the switching of the always-on PDU session, improving the user experience.

It should be noted that the deactivation management and session switching management performed by the SMF on the always-on PDU session are both based on the preset local policy in the embodiments of the present invention. The local policy can be set as: in certain specific scenarios, the SMF does not trigger the deactivation process of the always-on PDU session, and the SMF accepts the session switching of the always-on PDU session; or can be set as: in these specific scenarios, the SMF triggers the deactivation process of the always-on PDU session, and the SMF rejects the session switching of the always-on PDU session, which is not limited in the embodiments of the present invention. That is to say, compared with the prior art, the influencing factors for the SMF to manage the PDU session in the embodiment of the present invention increase the PDU session attribute and the local policy, which is more flexible and reasonable.

Figure 5:
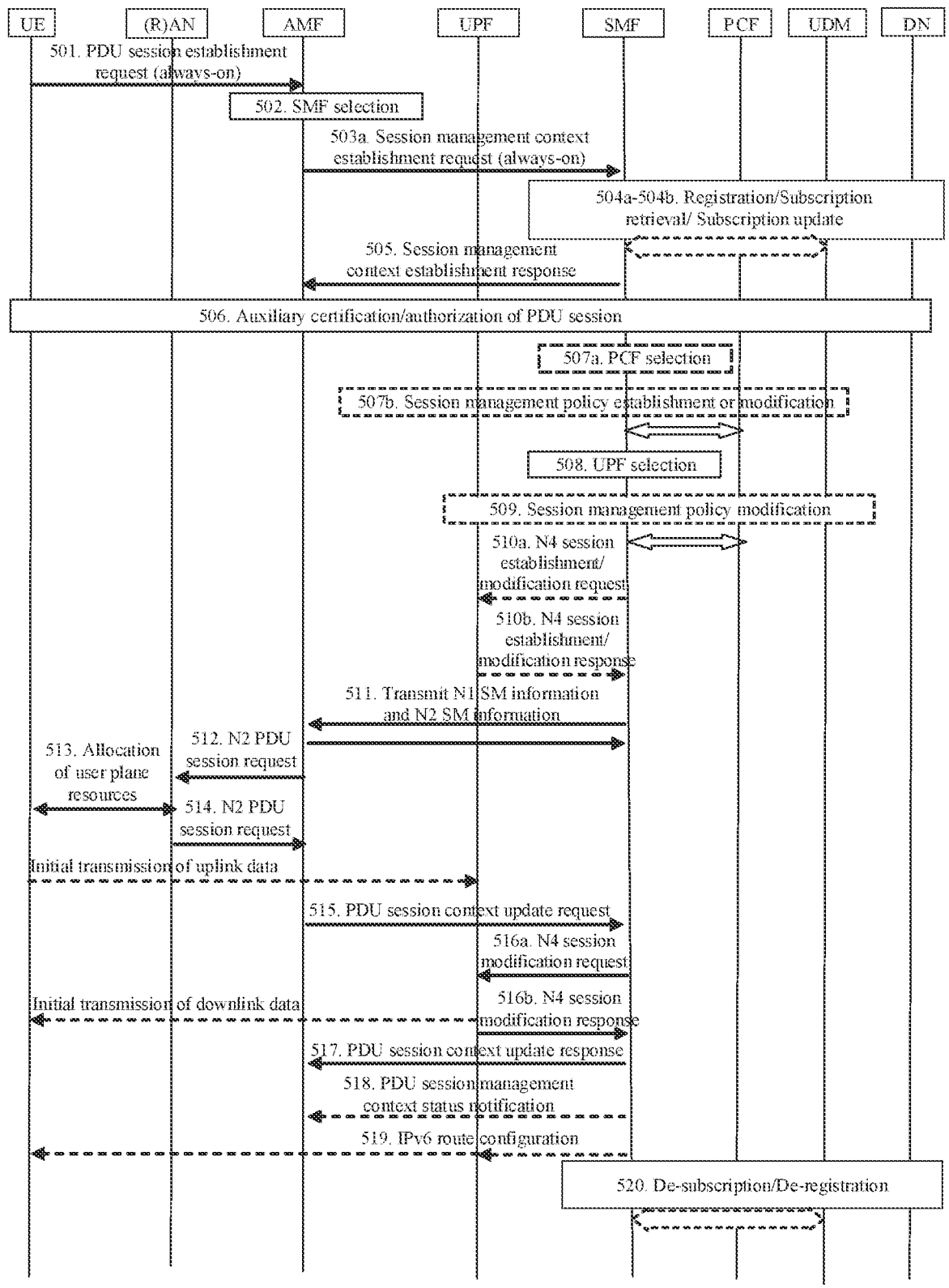
FIG. 5 is a schematic diagram of a process of establishing a PDU session of which the attribute is determined by a. UE as an always-on PDU session in a first embodiment of the present invention.

In order to understand the invention more clearly, the specific embodiments are used below to describe the foregoing process in detail. In the first embodiment, a UE determines the establishment of a PDU session of which the attribute is an always-on PDU session. Assuming that the UE has been registered in the AMF (unless the UE is registered urgently), the UE determines that the PDU session is an always-on PDU session in the establishment process of the PDU session. As shown in FIG. 5, the first embodiment includes the following steps.

Step 501: a UE sends an NAS message to the AMF, where the NAS message contains S-NSSAI(s), DNN, PDU session ID, request type, old PDU session ID, and PDU session establishment request (N1 SM container). At the same time, the session establishment request carries the attribute of the PDU session being an always-on PDU session.

Step 502 is the same as step 202, and will not be repeated in the first embodiment of the present invention.

Steps 503-505: the establishment of the session management context from the AMF to the SMF. The network side establishes an always-on PDU session as required by the UE, and records the attribute of the session as an always-on session in the session management context.

Specifically, the AMF sends a session management context establishment request (Nsmf_PDUSession_CreateSM-Context Request) to the SMF according to the PDU session attribute carried in the received session establishment request sent by the UE. If the PDU session that the UE requests to establish is an always-on PDU session, the session management context establishment request sent by the AMF to the SMF carries the attribute information of always-on. If the PDU session that the UE requests to establish is not an always-on PDU session, the session management context establishment request sent by the AMF to the SMF does not carry the attribute information of always-on. The SMF determines whether the always-on PDU is an always-on PDU session according to the session management context establishment request, and records it in the session management context.

Steps 506-509 are the same as steps 206-209, and will not be repeated in the first embodiment of the present invention.

Steps 510*a*-510*b*: the SMF initiates an N4 session establishment process to the selected. UPF.

Step 510*a*: the SMF sends an N4 session establishment/ modification request to the UPF and provides the packet detection, execution and reporting rules to be installed on the UPF for the PDU session. If the CNF tunnel information is allocated by the SMF, the CN tunnel information is provided to the UPF in this step. Since this PDU session is an always-on PDU session, the SMF does not set an inactivity timer to provide it to UPF.

Step 510*b*: the UPF confirms by sending an N4 session establishment/modification response. If the CN tunnel information is allocated by the UPF, the CN tunnel information is provided to the SMF in this step.

Steps 511-520 are the same as steps 211-220, and will not be repeated in the first embodiment of the present invention.

Figure 6:
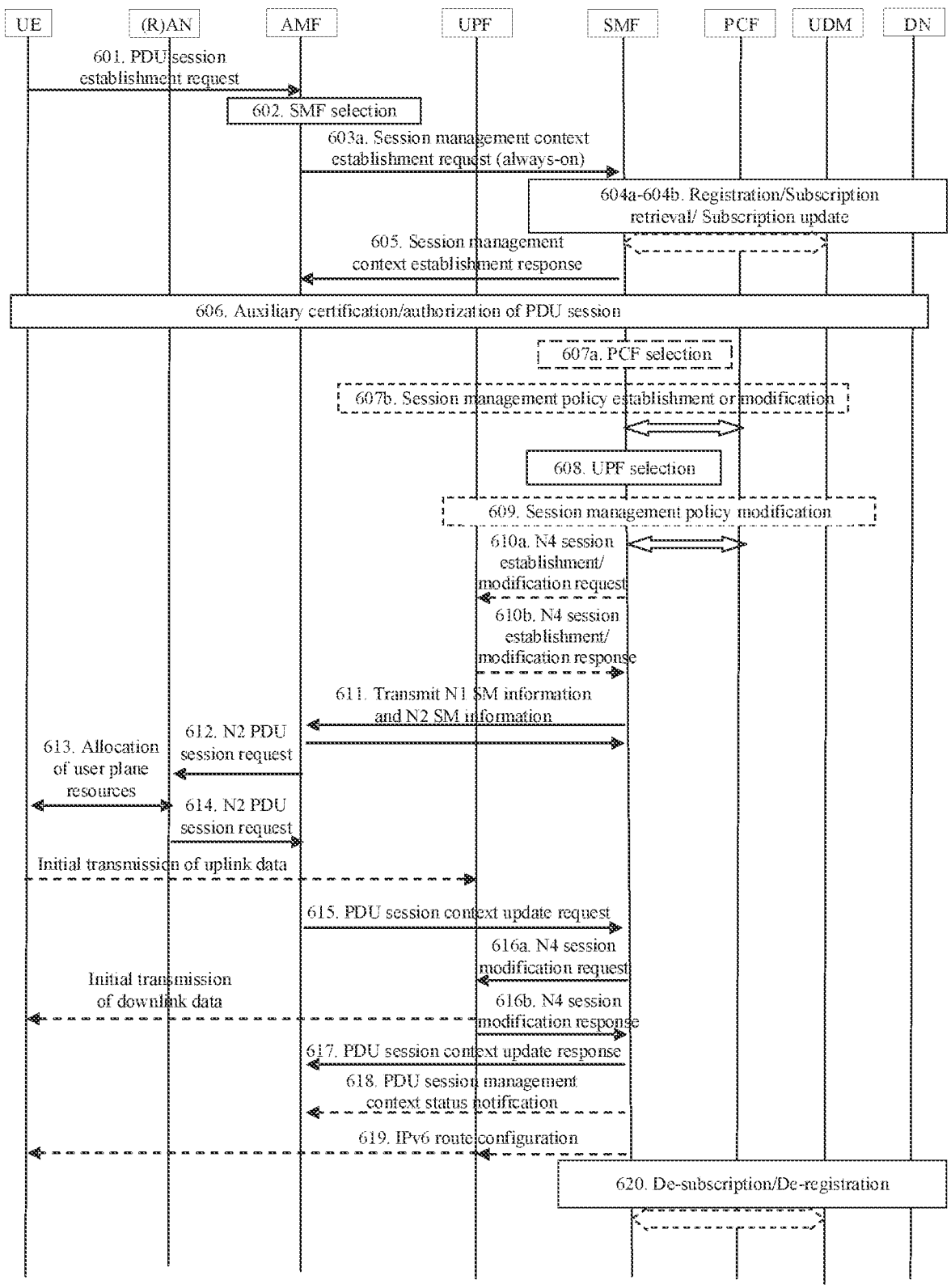
FIG. 6 is a schematic diagram of a process of establishing a PDU session of which the attribute is determined by the network side as an always-on PDU session in a second embodiment of the present invention.

In the second embodiment, the network side determines the establishment of a PDU session of which the attribute is an always-on PDU session. Assuming that the UE has been registered in the AMF (unless the UE is registered urgently), the network side decides that the PDU session is an always-on PDU session in the establishment process of the PDU session. That is, regardless of whether the UE carries the PDU session being an always-on PDU session in the session establishment request, the network side can determine that the PDU session is an always-on PDU session according to the user subscription information and/or local policy. As shown in FIG. 6, the second embodiment includes the following steps.

Step 601: a UE sends an NAS message to the AMF, where the NAS message contains S-NSSAI(s), DNN, PDU session ID, request type, old PDU session ID, and PDU session establishment request (N1 SM container). The difference from the first embodiment is that the session establishment request does not carry the attribute of the PDU session being an always-on PDU session.

Step 602 is the same as step 502, and will not be repeated in the second embodiment of the present invention.

Steps 603-605: the establishment of the session management context from the AMF to the SMF. The network side decides that the PDU session is an always-on PDU session, and records the attribute of the session as an always-on session in the session management context.

Specifically, the AMF sends a session management context establishment request (Nsmf_PDUSession_CreateSMContext Request) to the SMF according to the PDU session attribute carried in the received session establishment request sent by the UE. At this time, the PDU session that the UE requests to establish is not an always-on PDU session, so the session establishment request does not carry the information that the PDU session is an always-on PDU session. However, at the network side, the AMF may decide that the PDU session is an always-on PDU session according to the local policy and/or the user subscription information in the network, and the session management context establishment request sent by the AMF to the SMF carries the attribute information of always-on. The SMF determines that the always-on PDU is an always-on PDU session according to the session management context establishment request, and records it in the session management context. It may also be the case that the SMF determines that the PDU session is an always-on PDU session and records it in the session management context.

Steps 606-620 are the same as steps 506-520, and will not be repeated in the first embodiment of the present invention.

Figure 7:
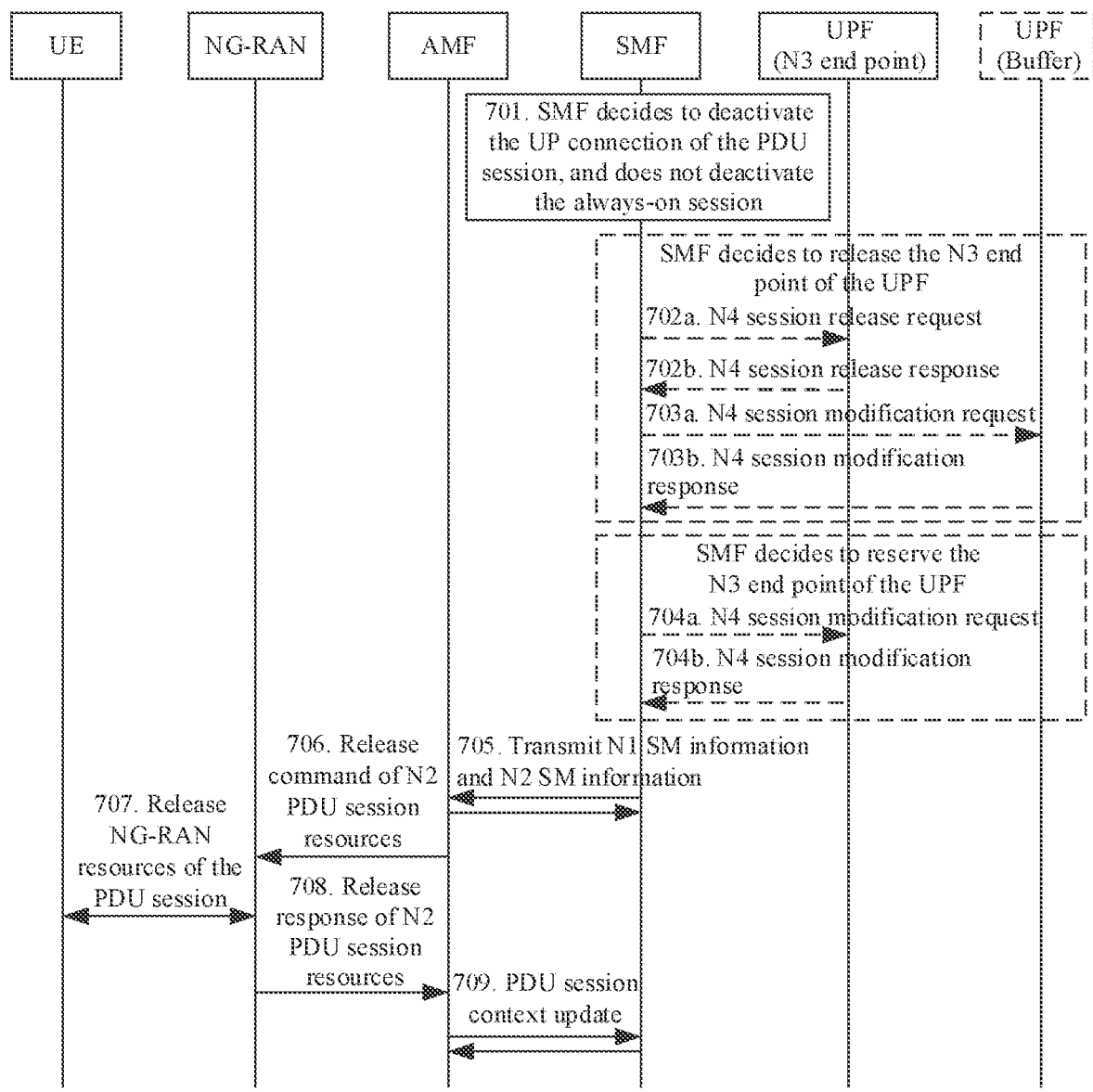
FIG. 7 is a schematic diagram of a process in which the network side initiates the selective deactivation of the UP connection of the PDU session in a third embodiment of the present invention.

In the third embodiment, the network side initiates the selective deactivation of the UP connection of the PDU session. The following process is used to deactivate the UP connection of the established PDU session of the UE in the CM-CONNECTED state. The network side manages the deactivation of the PDU session and needs to consider that the PDU session is an always-on PDU session. As shown in FIG. 7, the third embodiment includes the following steps.

Step 701: the SMF decides to deactivate the UP connection of the PDU session in the following scenario 5 and scenario 6.

Scenario 5: the target NG-RAN rejects all QoS Flows of the always-on PDU session during the switching process.

Scenario 6: the always-on PDU session is an LADN PDU session, and the AMF notifies the SMF that the UE has moved out of the LADN service area.

For the scenario 7 and scenario 8, the SMF decides whether to deactivate according to the local policy.

Scenario 7: the UPF detects that the PDU session has no data transmission during a specific inactive time period. For an always-on PDU session, since the SMF does not set an inactivity timer, this process will not be triggered; if the SMF has set an inactivity timer, the SMF can judge that the subsequent process will not be triggered for the always-on PDU session according to the session attribute. The judgment of the SMF can be a judgment directly based on the session attribute, or may be to determine whether the always-on PDU session needs to be deactivated according to the session attribute and local policy, such as operator policy.

Scenario 8: the AMF notifies the SMF that the UE has moved out of the allowed area. For the interaction between the always-on PDU session and the allowed area, it can be determined whether to deactivate the always-on PDU session according to the local policy and the recorded session attribute, that is, the UE moves out of the allowed area, and the always-on PDU session may also be not deactivated according to the policy setting.

The SMF may decide to release the N3 end point of the UPF. In this case, the SMF performs the steps 2 and 3. Otherwise, the SMF decides to reserve the N3 end point of the UPF, and then the SMF processes the step 4.

Steps 702-709 are the same as steps 302-309, and will not be repeated in the third embodiment of the present invention.

Figure 8:
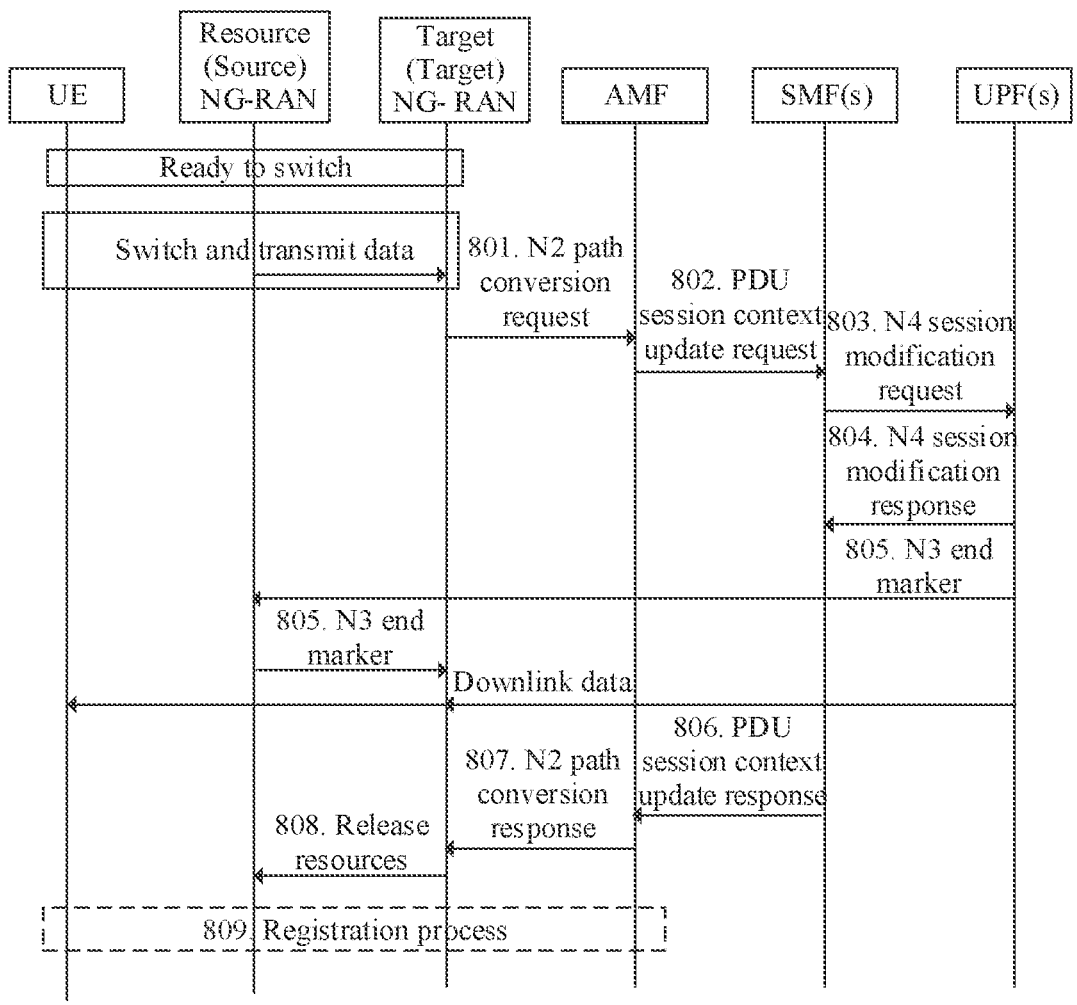
FIG. 8 is a flow schematic diagram of Xn-based cross-NG-RAN handover in a fourth embodiment of the present invention.

The fourth embodiment is a cross-NG-RAN switching (without UPF reallocation) process based on Xn. As shown in FIG. 8, the fourth embodiment includes the following steps.

Step 801: the target NG-RAN sends an N2 path conversion request to the AMF, where the request includes the PDU session that the UE needs to convert, the rejected PDU session, and the N2 SM information (modified PDU session).

Step 802a: the AMF sends an Nsmf_PDUSession_UpdateSMContext Request to the SMF, which includes the PDU session that needs to be converted, the rejected PDU session, the N2 SM information, and the location information of the UE.

If the UE enters the non-allowed area, the AMF informs each SMF that the UE can reach only in the case of regulatory prioritized services, that is, the following switching process will be performed for the PDU session only if the PDU session is regulatory prioritized services, otherwise the deactivation process is performed for the PDU session.

The SMF modifies (establishes) user plane resources for the always-on PDU session according to the session attribute in the session management context and the local policy, to complete the switching.

Step 802b: the AMF to the SMF: if the NG-RAN cannot establish user plane resources that conform to the User Plane Security Enforcement of which the value is required and thus refuses to establish PDU sessions, the AMF triggers the PDU session release process for these PDU sessions.

Steps 803-804: the SMF interacts with the UPF:N4 session modification.

Step 805: in order to assist the target NG-RAN to complete the reordering of the data packets, the UPF sends one or more "end marker" data packets on the old path immediately after the path conversion. The UPF starts to send the downlink data to the target NG-RAN.

Step 806: the SMF sends an Nsmf_PDUSession_UpdateSMContext Response to the AMF, where the request includes the CN tunnel information.

Step 807: the AMF sends an N2 path conversion request acknowledge message to the target NO-RAN, where the request includes the N2 SM information and the failed PDU session.

Step 808: the target NG-RAN sends a resource release message to the source NG-RAN to confirm the success of the switching. This will trigger the source NG-RAN to release resources.

Step 809: [conditional] if the triggering condition of the registration process is met, the UE may initiate the mobility registration update process.

Figure 9:
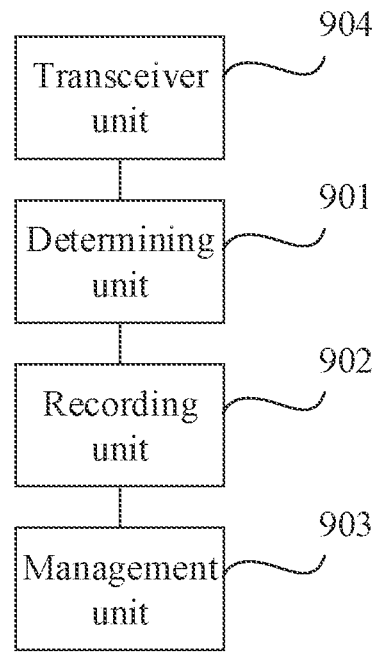
FIG. 9 is a structural schematic diagram of an always-on PDU session management device provided by an embodiment of the present invention.

An embodiment of the present invention further provides an always-on PDU session management device, as shown in FIG. 9, including:

a determining unit 901 configured to determine that the attribute of a PDU session is an always-on PDU session;

a recording unit 902 configured to record the attribute of the PDU session in the session management context;

a management unit 903 configured to manage the PDU session according to the attribute of the PDU session in the session management context.

Optionally, the device further includes a transceiver unit 904 configured to receive a session management context establishment request sent by an access and mobility management function, wherein the session management context establishment request includes the attribute of the PDU session;

the determining unit 901 is configured to determine that the PDU session is an always-on PDU session according to the session management context establishment request.

Optionally, the attribute of the PDU session is obtained from a session establishment request from a user equipment forwarded by the access and mobility management function, wherein the session establishment request includes the attribute of the PDU session; or the attribute of the PDU session is determined by the access and mobility management function and included in the session management context establishment request, and the access and mobility management function determines the attribute of the PDU session according to one or more of: a received session establishment request sent by a user equipment, user subscription information and/or a preset policy.

Optionally, the determining unit 901 is further configured to:

determine the attribute of the PDU session according to one or more of: a session management context establishment request, user subscription information and/or a preset policy.

Optionally, the management unit 903 is specifically configured to:

perform the deactivation management on the PDU session according to the attribute of the PDU session in the session management context; or perform the session switching management on the PDU session according to the attribute of the PDU session in the session management context.

Optionally, the management unit 903 is configured to:

set no inactive time period for the PDU session according to the attribute of the PDU session being the always-on PDU session.

Optionally, the transceiver unit 904 is configured to send an inactive time period to a user plane function; and receive a message sent by the user plane function that the PDU session has no data transmission during the inactive time period;

the management unit 903 is configured to trigger no deactivation process of the PDU session according to the attribute of the PDU session being the always-on PDU session.

Optionally, the transceiver unit 904 is configured to receive a message sent by the access and mobility management function that the user equipment moves out of an allowed area;

the management unit 903 is configured to trigger no deactivation process of the PDU session according to the attribute of the PDU session being the always-on PDU session.

Optionally, the transceiver unit 904 is configured to receive a session update request sent by the access and mobility management function;

the management unit 903 is configured to:

determine that the user equipment enters a non-allowed area;

modify user plane resources for the PDU session and perform session switching according to the attribute of the PDU session being the always-on PDU session.

Figure 10:
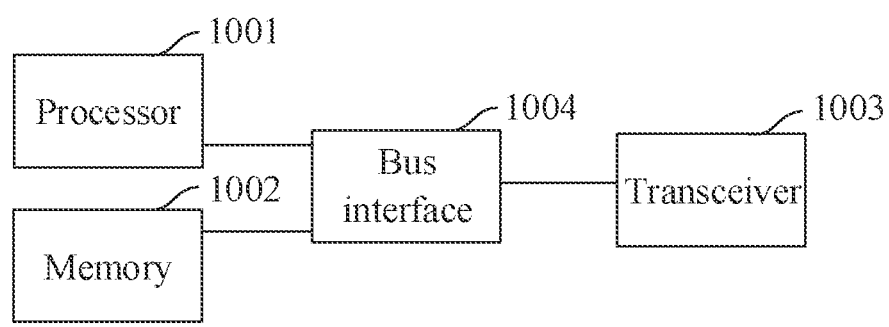
FIG. 10 is a structural schematic diagram of an electronic device provided by an embodiment of the present invention.

Based on the same principle, the present invention further provides an electronic device, as shown in FIG. 10, including:

a processor 1001, a memory 1002, a transceiver 1003, and a bus interface 1004, wherein the processor 1001, the memory 1002 and the transceiver 1003 are connected through the bus interface 1004.

The processor 1001 is configured to read a program in the memory 1002 to perform the following method:

determining that the attribute of a PDU session is an always-on PDU session;

recording the attribute of the PDU session in the session management context;

managing the PDU session according to the attribute of the PDU session in the session management context.

Further, the processor 1001 is configured to:

receive a session management context establishment request sent by an access and mobility management function, wherein the session management context establishment request includes the attribute of the PDU session;

determine that the PDU session is an always-on PDU session according to the session management context establishment request.

Further, the processor 1001 is configured to achieve following:

the attribute of the PDU session is obtained from a session establishment request from a user equipment forwarded by the access and mobility management function, wherein the session establishment request includes the attribute of the PDU session; or the attribute of the PDU session is determined by the access and mobility management function and included in the session management context establishment request, and the access and mobility management function determines the attribute of the PDU session according to one or more of: a received session establishment request sent by a user equipment, user subscription information and/or a preset policy.

Further, the processor 1001 is configured to:

determine the attribute of the PDU session according to one or more of: a session management context establishment request, user subscription information and/or a preset policy.

Further, the processor 1001 is configured to:

perform the deactivation management on the PDU session according to the attribute of the PDU session in the session management context; or perform the session switching management on the PDU session according to the attribute of the PDU session in the session management context.

Further, the processor 1001 is configured to:

set no inactive time period for the PDU session according to the attribute of the PDU session being the always-on PDU session.

Further, the processor 1001 is configured to:

send an inactive time period to a user plane function;

receive a message sent by the user plane function that the PDU session has no data transmission during the inactive time period;

trigger no deactivation process of the PDU session according to the attribute of the PDU session being the always-on PDU session.

Further, the processor 1001 is configured to:
receive a message sent by the access and mobility management function that the user equipment moves out of an allowed area;
trigger no deactivation process of the PDU session according to the attribute of the PDU session being the always-on PDU session.

Further, the processor 1001 is configured to:
receive a session update request sent by the access and mobility management function, and determine that the user equipment enters a non-allowed area.

It should be understood by those skilled in the art that the embodiments of the invention can provide methods, systems and computer program products. Thus the invention can take the form of hardware embodiments alone, software embodiments alone, or embodiments combining the software and hardware aspects. Also the invention can take the form of computer program products implemented on one or more computer usable storage mediums (including but not limited to magnetic disk memories, CD-ROMs, optical memories and the like) containing computer usable program codes therein.

The invention is described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the invention have been described, those skilled in the art can make additional alterations and modifications to these embodiments once they learn about the basic creative concepts. Thus the attached claims are intended to be interpreted to include the preferred embodiments as well as all the alterations and modifications falling within the scope of the invention.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

What is claimed is:

1. An always-on PDU session management method, comprises:
    determining, by a session management function, that an attribute of a Protocol Data Unit, PDU, session is always-on;
    recording, by the session management function, the attribute of the PDU session in a session management context;
    managing, by the session management function, the PDU session according to the attribute of the PDU session in the session management context, comprising one of following schemes:
    scheme 1:
    sending, by the session management function, an inactive time period to a user plane function;
    receiving, by the session management function, a message sent by the user plane function that the PDU session has no data transmission during the inactive time period;
    not deactivating the PDU session in response to the attribute of the PDU session in the session management context being always-on;
    scheme 2:
    performing a session switching on the PDU session in response to the attribute of the PDU session in the session management context being always-on,
    wherein the performing a session switching on the PDU session, comprises:
    receiving, by the session management function, a session update request sent by the access and mobility management function, and determining that the user equipment enters a non-allowed area;
    modifying, by the session management function, user plane resources for the PDU session to switch the user plane path according to the attribute of the PDU session being the always-on PDU session.

2. The method of claim 1, wherein the determining, by the session management function, that an attribute of a PDU session is always-on, comprises:
    receiving, by the session management function, a session management context establishment request sent by an access and mobility management function, wherein the session management context establishment request comprises the attribute of the PDU session;
    determining, by the session management function, that the PDU session is always-on according to the session management context establishment request.

3. The method of claim 2, wherein the attribute of the PDU session is obtained from a session establishment request from a user equipment forwarded by the access and mobility management function, wherein the session establishment request comprises the attribute of the PDU session; or
    the attribute of the PDU session is determined by the access and mobility management function and included in the session management context establishment request, and the access and mobility management function determines the attribute of the PDU session according to one or more of: a received session establishment request sent by a user equipment, user subscription information and/or a preset policy.

4. The method of claim 1, wherein the determining, by the session management function, that an attribute of a PDU session is always-on, comprises:

determining, by the session management function, the attribute of the PDU session according to one or more of: a session management context establishment request, user subscription information and/or a preset policy.

5. The method of claim 1, wherein the not deactivating the PDU session, comprises:

setting, by the session management function, no inactive time period for the PDU session according to the attribute of the PDU session being always-on.

6. The method of claim 1, wherein the not deactivating the PDU session, comprises:

receiving, by the session management function, a message sent by the access and mobility management function that the user equipment moves out of an allowed area;

triggering, by the session management function, no deactivation process of the PDU session according to the attribute of the PDU session being the always-on.

7. An electronic device, comprises:

at least one processor, and a memory communicatively connected to the at least one processor; wherein:

the memory is configured to store instructions; the at least one processor is configured to execute the instructions to perform a process of:

determining that an attribute of a Protocol Data Unit, PDU, session is always-on;

recording the attribute of the PDU session in a session management context;

managing the PDU session according to the attribute of the PDU session in the session management context by one of following schemes:

scheme 1:

sending an inactive time period to a user plane function;

receiving a message sent by the user plane function that the PDU session has no data transmission during the inactive time period;

not deactivating the PDU session in response to the attribute of the PDU session in the session management context being always-on;

scheme 2:

performing a session switching on the PDU session in response to the attribute of the PDU session in the session management context being always-on, wherein the performing a session switching on the PDU session, comprises:

receiving a session update request, and determining that the user equipment enters a non-allowed area;

modifying user plane resources for the PDU session to switch the user plane path according to the attribute of the PDU session being the always-on PDU session.

8. A non-transitory computer readable storage medium, configured to store computer instructions which cause a computer to perform the method of claim 1.

9. The electronic device of claim 7, wherein the determining that an attribute of a PDU session is always-on, comprises:

receiving a session management context establishment request sent by an access and mobility management function, wherein the session management context establishment request comprises the attribute of the PDU session;

determining that the PDU session is always-on according to the session management context establishment request.

10. The electronic device of claim 9, wherein, the attribute of the PDU session is obtained from a session establishment request from a user equipment forwarded by the access and mobility management function, wherein the session establishment request comprises the attribute of the PDU session; or the attribute of the PDU session is determined by the access and mobility management function and included in the session management context establishment request, according to one or more of: a received session establishment request sent by a user equipment, user subscription information and/or a preset policy.

11. The electronic device of claim 7, wherein the determining that an attribute of a PDU session is always-on, comprises:

determining the attribute of the PDU session according to one or more of: a session management context establishment request, user subscription information and/or a preset policy.

12. The electronic device of claim 7, wherein the not deactivating the PDU session, comprises:

setting no inactive time period for the PDU session according to the attribute of the PDU session being the always-on PDU session.

13. The electronic device of claim 7, wherein the not deactivating the PDU session, comprises:

receiving a message sent by the access and mobility management function that the user equipment moves out of an allowed area;

not deactivating the PDU session according to the attribute of the PDU session being always-on.

* * * * *